United States Patent [19]

Maroy et al.

[11] Patent Number: 5,518,996
[45] Date of Patent: May 21, 1996

[54] FLUIDS FOR OILFIELD USE HAVING HIGH-SOLIDS CONTENT

[75] Inventors: Pierre Maroy, Buc; Jean-François Baret, Paris, both of France

[73] Assignee: Dowell, a division of Schlumberger Technology Corporation, Houston, Tex.

[21] Appl. No.: 521,002

[22] Filed: Aug. 30, 1995

Related U.S. Application Data

[63] Continuation of Ser. No. 226,125, Apr. 11, 1994, abandoned.

[51] Int. Cl.⁶ .................................................. C09K 7/02
[52] U.S. Cl. ........................ 507/100; 507/140; 507/142; 507/143; 507/906
[58] Field of Search ..................................... 507/100, 140, 507/142, 143, 145, 906

[56] References Cited

PUBLICATIONS

Kirk–Othmer Encyclopedia of Chemical Technology, vol. 17, pp. 143–167, (1982), "Petroleum (Drilling Fluids)".
Kirk–Othmer Encyclopedia of Chemical Technology, vol. 7, pp. 297–299, (1965).

*Primary Examiner*—Philip Tucker
*Attorney, Agent, or Firm*—John E. Vick, Jr.

[57] ABSTRACT

The particulate phase of fluids according to the present invention comprises particles which have specifically adapted size ranges or granulometries. All the essential properties of fluids and their cost are very clearly improved. The technique may be applied to all well operations in oil wells or the like, such as in matrix treatment and the like.

13 Claims, No Drawings

FLUIDS FOR OILFIELD USE HAVING HIGH-SOLIDS CONTENT

This application is a continuation of Ser. No. 08/226,125 filed Apr. 11, 1994, now abandoned.

The present invention relates to the technical domain of oil, water and geothermal wells or the like and the corresponding operations carried out in these well types.

The present invention applies to drilling fluids, fracturing fluids, spacers, diverting fluids, gravel-packing fluids and generally all similar fluids and all operations using these fluids.

Such well operations are very well known in the art. The many difficulties in the performance of such well operations are also well known.

Drilling fluids, in particular drilling muds, are well known. These are generally loaded fluids that have to present very precise characteristics.

Further, because of the need for physio-chemical compatibility with the drilled formations, these fluids have to present very precise characteristics, principally towards density, rheology, lubricating properties and fluid loss, without jeopardizing the rate of penetration.

Density plays an essential hydrostatic function toward drilling safety, in order to prevent hole invasion by formation fluids which could lead to a catastrophic blow-out or, alternatively, cause the development of a fracture in the drilled formations leading to fluid loss or, potentially, to complete loss of control of the well.

Density also has an influence on the stability of the open hole, the weight of the mud column balancing the lithostatic pressure exerted on the formation.

The rheological characteristics of the fluid must achieve a balance between a minimal charge loss and the ability to raise up the drill cuttings through the well annulus to the surface.

Generally, it is desired to minimize fluid loss due to fluid exposure to porous formations, in order not to jeopardize the safety of the operation and its economic viability. Special care is given during payzone drilling, in order to minimize damage due to fluid invasion that would require some sort of postdrilling curative treatment to remove the damage.

It will be easily understood that the design of a drilling mud for a particular situation results in a subtle compromise between sometimes contradictory aims. For example, it is usually admitted by those skilled in the art, that the aforementioned desirable properties affecting fluid loss, are harmful to the rate penetration, especially for roller-bits. It is also known that a high solid content in a drilling fluid is sometimes needed for a high density or high viscosity fluid but that this is also harmful to the rate penetration.

These contradictory aims are currently only partially solved by the use of chemical additives, drawbacks of which are mentioned below, in particular, their potential impact on the environment as well as their high cost.

In contrast, the present invention suggests that, due to a precise choice of the size range of the suspended solids in the mud, it is possible to reconcile these apparently incompatible aims, or at least to minimize their antagonistic interactions.

Slim hole drilling provides another domain wherein the present invention finds use. Slim hole drilling requires low viscosity fluids, good control of water loss with very slight tendency to settling and bridging of the particles in an annulus that is often very narrow, in order to avoid large charge losses. An additional difficulty appears when a high density mud is required. The high ratio between the solids and the fluid can cause instability, also known as the "Boycott" effect. The present invention provides a solution to these problems.

In drilling fluid applications for slim holes, raising the mud density by using particles whose size is near that of cuttings must be avoided in order to minimize the viscosification effect on the mud by the cuttings and to favor the separation of the cuttings from the weighing agents on the shakers.

To avoid drill cutting reinjection, the rheology of the fluid must not be too high.

In the prior art, this requirement has prevented high concentrations of solids. Further, if the drill bit produces large cuttings, they must be reduced in size according to the prior art.

It will be seen hereafter that the invention makes it possible to have, at the same time, a low rheology and a high concentration in solid materials, and that large cutting sizes can be tolerated and are even preferred. The resulting fluid is particularly efficient and economical. In the application relative to cutting reinjection, it is preferred to use two or three disjointed cross profiles of particles and/or cuttings, the range of the larger sizes being chosen narrowly to minimize the viscosity reduction and therefore to be able to incorporate more solids, either by selecting suitable filters, or by adjusting the crusher in an appropriate way. On the contrary, the finest cross profile will be very broad in the smaller sizes in order to minimize the need for filtrate control and enhancing suspension stability.

Another important type of fluid used in the petroleum and related industries are spacer fluids.

During well casing cementing operations, it is required to physically separate the drilling mud already present in the wellbore as a result of the drilling operation from the cement slurry due to chemical incompatibilities between the mud and the cement. Either mechanical apparatus or inert separating fluids are used.

Separating fluids have two main functions, the first being to completely remove or "displace" the drilling mud, and the second being to prevent any cement/mud contact. Once again, the rheology, density and velocity profile characteristics of the fluid are of prime concern, as well as fluid loss control and settling control.

In the application of the present invention to spacers, it has been found that there is an important size ratio between two particle size profiles whose size ranges are contiguous. The ratio is preferably less than 15, because in this application, a very high resistance to settling is needed, as well as a high fluidity for turbulent flow applications. The aim is to minimize the smaller particles concentration in order to hinder settling.

With regard to fracturing fluids, these fluids are commonly viscosified, gelled and/or crosslinked, the function of which is to apply pressure to the formation rocks around the well, up to a pressure whereby the formation is fractured. One essential function of these fluids is to be capable of suspending a proppant and especially to carry this proppant without settling into the fracture created by the fluid. Once again the rheology, especially the so called "suspension" property, and the stability of these fluids is of first importance, as well as the property of fluid loss control.

Another essential characteristic of these fluids, as well as of gravel-packing fluids which will be mentioned below, is that they must retain good permeability after fracture closure.

A particular type of fracturing fluid consists of a pre-pad fluid whose function is to cover the fracture wall to optimize the action of the fracturing fluid which includes a support agent, and avoids fluid loss, especially in porous formations.

The invention makes it possible to form a cake which is fine and does not penetrate into the porous formation matrix. This cake has good behavior and is easily disintegrated in presence of the support agent after the completion of the fracturing operation, when pressure inversion occurs and well production is started, two additional contradictory imperatives in the prior art.

In pre-pad application for fracturing, the largest particles of the pre-pad are chosen, having a much smaller particle size, preferably at least two size ranges, relative to the proppant size, in order to favor loosening of the cake from the wall of the fracture when the production is started. The packing volume fraction for the particles is chosen very high, each cross profile of particles having a very narrow size distribution to obtain a very fine, hard and nonporous cake, which favors its loosening at the end of the operation and makes it possible to better control fluid loss during the creation of the fracture. As is known in the art, the packing volume fraction is the volume of the solid particulate materials in a fluid divided by the total volume of the fluid. The fracturing pre-pad type fluid of the invention may also be used as a fluid diverter in the acid treatment of a formation matrix.

The diverter application is similar to the pre-pad application with the difference being that there is no limit in the size of the largest particles that can be used, since at the end of the operation the cake does not fall into a narrow fracture but into the wellbore.

Another fluid type to which the present invention relates, are fluids used to place a gravel pack. These fluids must also carry particulate materials into the formation, the function of these particulate materials being to form a screen to prevent unconsolidated fine formation particles from plugging the near-wellbore zone adjacent casing the perforations through which the well fluid is produced.

Once again, a very accurate control of the rheology, viscosity, stability and suspension properties is required for such fluids.

In addition to the above mentioned need to retain high post-placement permeability, gravel pack fluids require good fluid loss control during placement.

In a preferred embodiment of the method of the invention, gravel pack fluids comprise two or more particle cross profiles wherein the cross profile of the greater diameter particles differs chemically from the smaller particles, and wherein the smaller particles may be degraded at a later process stage.

Such chemical distinction of the particles makes it possible to clean out the gravel pack, for example, by an acid treatment. Because of the differing chemical constituency of the particles in the thus formed cake, the fine particles can be removed by dissolution leaving the larger particles in contact with one another which enables the gravel pack to be very porous.

The particles sizes must be chosen in a size ratio of 10 to 15, in order that the smaller particles become lodged in the cake. For same reasons, slurries with very high particle content are chosen. As a result, the fluids exhibit low viscosity and a reduced slurry sensitivity to potential fluid loss.

As above mentioned, the use of all of the above types of fluids and their required properties are well known in the art.

Numerous additives for these fluids are also known and they are commonly used alone or in various combinations in order to design the best possible fluid for a given well or application.

Fluid design is never easy. The fluid used is often imperfect because its formulation has required compromises among the many desired properties whose solutions are often antagonistic.

On the other hand, there is always a certain degree of uncertainty over conditions in the well such as maximum temperature, presence and location of thief zones, etc. In the prior art, these uncertainties have been compensated for by applying an overdose of some additive(s) in order to avoid a major risk thereby adding cost and complexity to the fluids.

The present invention provides a design technique for well treatment fluids, characterized by great simplicity, low cost, and excellence of the achieved properties. A spectacular improvement of all the useful properties is indeed achieved in a easy manner without producing any disadvantages and especially without any antagonism between the achieved effects.

The method according to the present invention is characterized in that into the considered fluid is incorporated insoluble particulate additives so that their combination with each other and with the other fluid particulate components will produce a size range distribution which will deeply change in an unexpected way numerous essential fluid properties. Most preferably, said particulate additives are of mineral type. The mineral additives are most preferred because of their low cost and their innocuousness in the environment. However, the present invention can also use polymeric wastes or other solid wastes which have been reduced to the appropriate size range for use in accordance with this invention. As a secondary consideration, there may be a beneficial effect on the environment through the disposal into the controlled environment of a subterranean well, wastes which cannot be degraded which otherwise must be put in a waste disposal area.

With regard to drilling muds, the development and presence of particulate cuttings within the mud renders drilling mud design according to the present invention especially difficult.

Fracturing and gravel-packing fluids formulation is also difficult because the final permeability of the proppant or gravel pack will be decreased by the presence of fines incorporated into the fluids and the resulting packs according to the present invention. For this reason, fines have always been excluded from such fluids in the prior art.

In the state of the art, additions of particulate minerals to a petroleum fluid have been carried out in order to improve some properties. It is also known that most of the above mentioned critical properties of the concerned fluids have been controlled up to now with the help of organic additives.

These additives often present serious problems which are well known in the art because they often have a simultaneous and contradictory action on a given property or act simultaneously on several properties.

For example, a dispersing agent lowers the viscosity of the fluid but also accelerates the settling of suspended solids. A fluid loss control agent obviously lowers the fluid loss but also increases the viscosity of the fluid. Moreover, most of the known additives also have an influence on the fluid mechanisms and/or on the formation itself.

It is also known that the efficiency range of such additives is often narrow due to a sensitivity to temperature, to ion concentration (salts) in the interstitial water, etc., and possibly to formation components. Despite long and expansive developments, the result is often a formulation which is suitable only for a narrowly focused range of temperature and/or salinity and/or type of formation, etc.

This has been admitted in the prior art for several decades. Thus, the number of additives has been multiplied with generally specific conditions of use for each one. In order to mitigate the disadvantages of the complexity of the possible fluids and their specialized uses, a large body of software has been developed. This software only points out the chemical formulation complexity, and makes the management of this complexity easier. However, such design software offers no solution to any of the disadvantages of the complex fluid systems.

In a surprising manner, the present invention removes the complexity.

For the first time, instead of combining together more and more additives which are more and more complex, it has been discovered that numerous essential properties can be met by appropriate selection and combination of particulate products having different size ranges.

Such products used according to the present invention are preferably mineral materials such as silica, hematite or other iron oxide, barium hydroxide, carbonates, alumina etc., and organic products such as plastic wastes and other compatible wastes. Especially, the choice is determined by, for example, the desired density. It has been discovered that, by using a selected combination of several size ranges of these types of material combined with the size range of the other components of the considered fluid, a converging set of favorable properties have been spontaneously achieved. The size ranges of the preferred solid products are selected, as well as their respective proportions, in order provide maximum PVF (PVF being the Packing Volume Fraction), or as close as possible to this maximum PVF. The proportion of solid materials in relation to the fluid is selected so that the fluid is in a hindered settling state. It is known that, in such a state, solid particles behave "collectively" like a porous solid material. On the contrary, when a fluid is not in this state, the different sized particles will settle separately at different speeds. This hindered settling state corresponds, in practice, to a much higher solid material concentration in the fluid than that present in the prior art. A high solid material concentration threshold beyond which the hindered settling state appears has been discovered.

This threshold depends of course of the chosen size ranges.

It is important to mention that such concentrations which were thought to be impossible to use in the prior art because of serious problems of too high viscosity and mixability are usable according to the invention thanks to the choice of conditions that are close to the PVF maximum.

The invention consists therefore of the combination of three critical features:

a) use of at least three particulate materials, preferably mineral materials, that are insoluble in a preferably aqueous fluid medium, the at least three size ranges being "disjointed" as described hereinafter, and b) the choice of the proportions in the solid materials defined at a), in relation to the mixing so that the fluid is in the hindered settling state, and c) the choice of the proportions in the solid materials defined at a), between each other, and according to their respective size ranges, so that substantially the maximum PVF is achieved for the sum total of all particles in the fluid system.

It has been seen that the "hindered settling" threshold has never been reached or approached in prior art fluids incorporating particulate materials for the oil industry. On the contrary, those skilled in the art have chosen only solid material concentrations which were low enough to avoid serious problems.

Furthermore, the importance of the PVF has never been mentioned in the general prior art of particulate materials.

Thus, according to the invention, the rheology, free water, settling, fluid loss control, compressive strength, stability, suspension properties and resultant permeability of oilfield fluids have been favorably and simultaneously improved, all substantially without requiring the use of conventional organic additives.

Indeed, the present invention comprises, and allows, combining the above sizes to very favorable values, by combining mineral materials of different, appropriately selected, size ranges, after which an accurate adjustment of properties is able to be achieved by adding only small quantities of conventional organic additives.

The present invention is based on a radically opposed concept, called below "multimodal" and the optimum of which is "multicontinuity". This concept has allowed simultaneous mixing of particles of more than two different size ranges including large dimensional particles. The result is that, provided at least a small quantity of fines is included, no significant settling occurs, but in an very unexpected manner, all the essential fluid properties are improved without the use of conventional additives.

The "multimodal" concept as well as its optimal realization constituted by the multicontinuity of the particulate phases according to the present invention will be evident from the following detailed description.

The "multimodal" concept is linked to the aforementioned PVF feature and is based first on the use of large dimension mineral particles. This absolutely goes against the prior art teaching according to which the presence of large particles, and/or very large particles definitely implies a settling risk, which is true. As these particles must be present in the considered fluids, the prior art has required chemical palliatives and correctors to make these fluids usable.

The present invention has overcome this prior art technical block by simultaneously using "fine", preferably mineral, particles and it has been discovered that the "large" or "very large" or "medium" particles and "fine" particles cooperatively stabilize the fluid instead of producing the expected disadvantages such as settling, viscosification and the like, according to the prior art teaching. The invention, according to three above criteria, makes it possible to incorporate "very large" particles.

In any case, the invention significantly reduces the cost of the considered oil fluids. Obviously, once this "multimodal" concept has been stated, the different combinations between the "medium" particles, one or several "fine" particles, one or several "large" particles, or the like, have been multiplied. All the results have been convergent.

According to the above principle of the present invention, which consists of incorporating the "large" or "very large", and/or "medium" particles combined with "fine" and possibly "very fine" particles, the preferred "trimodal" combination comprises particles having the following sizes:

"medium" (average dimension=10–20 micrometers)

"fine" (average dimension=1 micrometer)

"very fine" (average dimension=0.1–0.30 micrometers)

which combination achieves all of the above mentioned advantages without requiring the use of conventional additives.

Additionally, a preferred "tetramodal" combination comprises particles which include:

"large" (average dimension=200 micrometers and more)

"medium" (average dimension=10–20 micrometers)

"fine" (average dimension=1 micrometer)

"very fine" (average dimension=0.1–0.30 micrometers)

which further improves all of the desired fluid properties.

In accordance with the invention and despite the very high solid material concentrations that are possible and desired according to the invention, the mixability is improved in a surprising way.

In accordance with another feature, the invention makes it possible to reduce the rheology sensitivity toward external conditions such as fluid loss, and the like. This results in much higher operational safety due to the fact that fluids in accordance with the invention advocate to use of a solid material content above the threshold which leads to "hindered settling" of the particles.

According to the prior art, such concentrations should inescapably bring about a precipitation and a dehydration of the fluid.

To the contrary, as a result of the PVF in accordance with the invention, this will not occur. Generally, the "tetramodal" mode will be preferred to the "trimodal" mode.

An essential characteristic which must be respected is that the size ranges employed must not widely overlap each other.

In practice, it can be roughly considered that the criterion which has to be respected in choosing the particle sizes to be used is that the size range curves have an "offset" of at least a half-peak distance as depicted in the Figure.

This criterion can be then roughly symbolized by the "disjointed size ranges" notion which will be explained for more clarity.

For example, very good results have been achieved with a "offset" ratio of about 5 to 50, and preferably about 10, between each average dimension, as according to the tri- and tetramodal examples above, but not by way of limitation.

Obviously, a "pentamodal" mode etc. produces results which are at least as useful as the results given by a tetra- or even tri-modal mode. However, the additional benefit is linked with additional complexity, and these modes, though they are realizable and usable, will be less preferred except for some very particular applications.

The further combinations will also be cited according to the above mentioned criteria between the further categories of particles:

"very large", for example glass maker sand, crushed wastes (average dimension>1 mm) and/or "large", for example sand or crushed wastes (average dimension=200–800 μm) and/or "medium", for example crushed wastes (average dimension 10–20 μm) and "fine" for example, a micromaterial, or some micro fly ashes or some other micro slags (average dimension 0.5–10 μm) and/or "very fine" like, for example, a latex or some pigments or some polymer microgels like a usual fluid loss control agent (average dimension 0.05–0.5 μm) and/or "ultra fine" for example some colloidal silica or alumina, etc. (average dimension 7–50 nm).

"Ultra-fine" particles are only used for example in the cases where an extreme stoppage or plugging is desired in an aggressive medium, and for example at high temperature, when cost is not the most important feature.

In many cases, it will be possible to avoid the use of "very fine" particles. Indeed, the further improvement in the properties, which is brought about by adding "very fine" particles, could be economically unprofitable, especially as far as filtrate control is concerned. It will be noted that this is possible only thanks to the already momentous improvement achieved according to the invention by a combination that doesn't include any "very fine" particles, the improvement making it possible to avoid or reduce the use of costly organic additives.

In practice, as will be shown by the additional examples, below, common well cementing can be achieved using the three aforementioned criteria with combination of particles which includes:

very large large medium fine or large medium (crushed wastes)

fine (micro fly ashes, etc.)

and other combinations that will appear obvious for those skilled in the art.

Generally speaking, the invention consists of the combination of:

A. "Large" particles having an average dimension of about 100–300, preferably 200 micrometers, and more, selected according to the fluid to be designed, among for example gravel, sand, silica, carbonate, barium, hydroxide, hematite and other iron oxides or the like, and some crushed plastic wastes or the like.

B. "Medium" particles (10.20 micrometers), for example crushed wastes.

C. "Fine" particles (about 1 micrometer) selected among:

carbonates such as marble, chalk, calcite barium hydroxide hematite and other iron oxides silicate, carbon, sulfur or the like and some fine industrial wastes.

D. "Very fine" particles (about 0,1 micrometer) for example latex, silica condensate (silica fume) or a condensate of manganese oxide fumes.

It has been shown that it may also be very profitable to use "very large" particles (>1 mm) and, in the cases for which the technical problems to be solved are extreme, "ultra fine" particles. A particularly profitable combination will be of the "trimodal" type:

large sand such as glass maker sand having an average size of 350 micrometers;

medium material such as crushed industrial wastes having an average size of 10–20 micrometers, and microsilica or industrial wastes having an average size of 0.5–3 micrometers, the combination being added with a very slight amount (0.5% in relation to the solids) of organic fluid loss control agent, and, optionally, very slight amounts of other usual organic additives, to optimize and refine the fluid properties.

The following examples illustrate the invention without limiting its scope.

The fields of relative proportions for the different kinds of particulate materials won't be given here.

Indeed, the percentages of A, B, etc. must be established according to the achievement criterion for the maximum PVF or of a PVF as close as possible to the PVF maximum. The calculation of the PVF is known and common. It is based on known equations including a "cutting" of each size range of each component of the particulate blending. In the further examples, the PVF values have been achieved by dividing each size range curve of each component into 31 "fractions".

The following examples illustrate the invention without limiting its scope.

EXAMPLE 1

A spacer fluid was prepared with:

206 g of water 656 g of calcium carbonate having an average particle size of 100 micrometers comprising 73% of the solids content of the fluid and microcarbonate having an average particle size of 2 micrometers comprising 27% of the solids content of the fluid, which forms a so-called "bimodal" combination according to the invention.

The density is 16 ppg (1.9 g/cm³).

Testing using a Fann 35 rheometer, using rotor number 1, BOB number 1, spring number 1 and a spring strength of 0, the following results at ambient temperature are obtained:

| Standard | 10D | PV (cP) | lbf/100 ft2 | Ty Pa | n | k lb.s n | viscosity cP |
|---|---|---|---|---|---|---|---|
| Newtonian | 0.945 | — | — | — | — | — | 142 |
| Bingham | 0.998 | 82.9 | 40.6 | 19.4 | — | — | — |
| Power law | 0.995 | — | — | — | 0.358 | 0.122 | — |

A settling test effected at 185° F. (85° C.) by measuring the density at the top and the base of a 250 ml fluid column according to API standards: diameter 40 mm, height 20 cm; measure after 2 hours, gives the following results:

Top: 1.85 g/cm³ (15.5 ppg)
Base: 1.86 g/cm³ (15.6 ppg)
Free water: 1.5%

The appearance of both good rheology and stability, without any organic additive, can be noticed.

EXAMPLE 2

A spacer according to the invention is prepared with:
205 cm³ of water
2.05 g of polynaphtalene sulfonate distributing agent
656 g of particulate materials including calcium carbonate having an average particle size of about 100 micrometers which comprises 66.4% of the solids volume, microcarbonate having an average particle size of about 2 micrometers which comprises 24.5% of the solids volume and microsilica having an average particle size of about 0.5 micrometer which comprises 9.1% of the solids volume.

The density is 1.9 g/cm³ (16 ppg).

In testing under the same conditions as in example 1, the following results are obtained:

| Standard | 10D | PV (cP) | lbf/100 ft2 | Ty Pa | n | k lb.s n | viscosity cP |
|---|---|---|---|---|---|---|---|
| Newtonian | 0.998 | — | — | — | — | — | 83.6 |
| Bingham | 1 | 77 | 4.54 | 2.17 | — | — | — |
| Power law (ambient Temperature) | 0.996 | — | — | — | 0.72 | 0.00836 | — |
| Newtonian | 0.987 | — | — | — | — | — | 46.2 |
| Bingham | 0.999 | 37.5 | 6.05 | 2.89 | — | — | — |
| Power law (85° C., 185° F.) | 0.995 | — | — | — | 0.514 | 0.0151 | — |

A settling test, in the same conditions as in example 1, gives the following results:

|  | at 85° C. (185° F.) | at 204° C. (400° F.) |
|---|---|---|
| Top | 1.84 g/cm³ (15.4 ppg) | 1.82 g/cm³ (15.2 ppg) |
| Basis: | 1.84 g/cm³ (15.4 ppg) | 1.83 g/cm³ (15.2 ppg) |

It can be seen that, with a very low distributing agent proportion, this trimodal combination leads to very advantageous low rheology and a lack of settling in spite of this very low rheology.

EXAMPLE 3

A trimodal combination according to the invention was prepared on the basis of:

Sand (about 180 micrometers) 66.4% BVOS*
Silica flour (about 20 micrometers) 24.5% BVOS
Carbonate (variable dimension) 9.1% BVOS
*BVOS=by volume of solids Calculated density: 1.9 g/cm³ (16 ppg)
Calculated porosity: 46%

The results obtained according to the carbonate dimension are laid further:

| Average dimension* of the carbonate | 4 micrometers | 2 micrometers | 1,3 micrometers |
|---|---|---|---|
| PV (cP) | 160 | 163 | 108 |
| Ty 1b/100 ft2 | 21.5 | 2.47 | 10 |
| Pa | 10.3 | 11.8 | 4.79 |

The same measures were effected by using a 2 micrometer (average dimension) carbonate and by adding a very low proportion of polynaphtalene sulfonate distributing agent.

The further results were obtained:

| Distributing agent % BWOW (% by weight of water) | 0 | 0,1 |
|---|---|---|
| PV (cP) | 163 | 121 |
| Ty 1b/100 ft2 | 24.7 | 17.0 |

| Distributing agent % BWOW (% by weight of water) | 0 | 0,1 |
|---|---|---|
| Pa | 11.8 | 8.14 |

Obviously, both good rheology and stability have been achieved for the considered systems.

EXAMPLE 4

A tetramodal system according to the invention has been prepared by using two different silica, an alumina and a latex Sand (180 micrometers): 64.1% BVOS Silica Flour (20 micrometers): 24.0% BVOS Alumina $Al_2O_3$ (density 3,85): 8.8% BVOS Latex styrene-butadiene: 3.1% BVOS (about 0,15 micrometers)

Alumina also plays a role of weighing agent.

In relation to the alumina particles average dimension, the further results are obtained.

| Average dimension* of alumina | porosity (%) density | | PV (cP) Ty | | filtrate | remarks |
|---|---|---|---|---|---|---|
| | (g/cm3) | [ppg] | (1b/100 f2) | [Pa] | | |
| 1,3 micrometer | 40.6 (2.0) | [17.0] | 179 (1.7) | [0.81] | 40 ml in 7 min | slight setting |
| 0,5 micrometer | 40.6 (2.0) | [17.0] | 188 (12) | [5.74] | 40 ml in 13 min | 0.2% of PNS (1) |

(1) PNS = polynaphthalenesulfonate

Both valuable rheology and fluid loss control are obtained.

EXAMPLE 5

A tetramodal system according to the invention was prepared with two different silica, a manganese oxide and a latex:

432 g of sand (180 micrometers)

162 g of silica flour (20 micrometers)

106.6 g of manganese oxide (1 micrometer)

Variable amount of latex styrene-butadiene (about 0.15 micrometer)

The water amount is adjusted to obtain a density of 1.84 g/cm³ (14.5 ppg).

The following results are achieved:

| latex amoutn (g) | 15 | 16.26 | 20 | 24 | 32.26 | 45 |
|---|---|---|---|---|---|---|
| PV (cP) | 84 | 90 | 94 | 76 | 53 | 61 |
| Ty (Pa) | 14 | 10 | 10 | 11 | 5 | 8.5 |
| Filtrate* | 50 ml in 30 sec | 48 ml in 1 min 30 sec | 15 ml in 30 min* | 9 ml in 30 min | 8 ml in 30 min | 7.5 ml in 30 min |
| Filtrate* according to API standards | 744 ml | 429 ml | 30 ml | 18 ml | 16 ml | 15 ml |

*at ambient temperature.

It is noticed that both rheology and fluid loss control are very good.

We claim:

1. A method of treating a subterranean formation comprising the steps of:

(a) providing a wellbore;

(b) providing a high-solids fluid comprising a liquid and at least three sizes of solid particulate materials selected from a group consisting of:

(i) very large particles having a particle size greater than 1 mm;

(ii) large particles having a particle size of from about 200–800 μm;

(iii) medium particles having a particle size of from about 10–20 μm;

(vi) fine particles having a particle size of from about 0.5–10 μm;

(v) very fine particles having a particle size of from about 0.05–0.5 μm, and (vi) ultrafine particles having a particle size of from about 7–50 nm, wherein the selected size of each of the at least three sizes of solid particulate materials is disjointed relative to the particle sizes of each of the other of the selected at least three sizes of solid particulate materials; wherein at least one of the selected three sizes of particulate materials comprises medium particles; wherein a solids volume total of the at least three particulate materials comprises substantially a maximum packing volume fraction for the selected sizes of the particulate materials and wherein the solids volume total is sufficient to substantially avoid settling of the solid particulate materials in the fluid (c) pumping the high-solids fluid into the wellbore.

2. The method as set forth in claim 1 wherein treating comprises drilling into the subterranean formation and the step of pumping comprises pumping the high-solids fluid through tubing and through a drill bit located at an end of the tubing in the subterranean formation.

3. The method as set forth in claim 2 wherein the step of providing a high-solids fluid comprises selecting at least three particulate materials from a group consisting of medium, fine, very fine and ultrafine particles.

4. The method as set forth in claim 1 wherein treating comprises cementing the wellbore and wherein the high-solids fluid comprises a spacer fluid and the step of pumping comprises pumping the high-solids spacer fluid between a drilling fluid and a cementing fluid.

5. The method as set forth in claim 4 wherein the step of providing a high-solids fluid comprises selecting at least three particulate materials from a group consisting of medium, fine, very fine and ultrafine particles.

6. The method as set forth in claim 1 wherein treating comprises treating for fluid loss further including the step of pumping the fluid into an area of one of the wellbore or the formation exhibiting high fluid loss.

7. The method as set forth in claim 6 wherein the step of providing a high-solids fluid comprises selecting at least three particulate materials from a group consisting of medium, fine, very fine and ultrafine particles.

8. The method as set forth in claim 1 wherein the treating comprises fracturing the subterranean formation and the step of pumping comprises pumping the high-solids fluid at a pressure in excess of the fracture breakdown pressure of the formation.

9. The method as set forth in claim 8 wherein the step of providing a high-solids fluid comprises selecting at least three particulate materials from a group consisting of medium, fine, very fine and ultrafine particles.

10. The method as set forth in claim 1 wherein the treating comprises gravel packing further including the step of pumping the high-solids fluid into an area adjacent the wellbore.

11. The method as set forth in claim 10 wherein the step of providing a high-solids fluid comprises selecting at least three particulate materials from a group consisting of medium, fine, very fine and ultrafine particles.

12. The method as set forth in claim 1 wherein the step of providing a high-solids fluid comprises selecting a solid, acid-soluble particulate meterial as at least one of the three sizes of particulate materials.

13. The method as set forth in claim 1 wherein the step of providing a high-solids fluid comprises selecting a solid particulate material comprising crushed solid waste as at least one of the three sizes of particulate materials.

* * * * *